(12) United States Patent
Yoshikawa

(10) Patent No.: US 7,750,519 B2
(45) Date of Patent: Jul. 6, 2010

(54) HYDRODYNAMIC BEARING DEVICE, MOTOR AND INFORMATION RECORDING AND REPRODUCING APPARATUS IN WHICH SAME IS USED, AND METHOD FOR MANUFACTURING SHAFT USED IN HYDRODYNAMIC BEARING DEVICE

(75) Inventor: Shoichi Yoshikawa, Tottori (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/259,550

(22) Filed: Oct. 28, 2008

(65) Prior Publication Data
US 2009/0108691 A1 Apr. 30, 2009

(30) Foreign Application Priority Data
Oct. 31, 2007 (JP) ............................. 2007-282705

(51) Int. Cl.
*H02K 7/08* (2006.01)
(52) U.S. Cl. ........................................................ 310/90
(58) Field of Classification Search ................. 310/90, 310/67 R
See application file for complete search history.

(56) References Cited

U.S. PATENT DOCUMENTS

| 6,179,932 B1 * | 1/2001 | Yoshino ................. 148/217 |
| 6,815,855 B2 * | 11/2004 | Yashiro et al. ............. 310/90 |
| 2008/0204929 A1 * | 8/2008 | Masazuki et al. .......... 360/110 |

FOREIGN PATENT DOCUMENTS

| JP | 3-237278 | 10/1991 |
| JP | 10-89345 | 4/1998 |
| JP | 2004-291851 | 10/2004 |

* cited by examiner

*Primary Examiner*—Dang D Le
(74) *Attorney, Agent, or Firm*—Wenderoth, Lind & Ponack, L.L.P.

(57) ABSTRACT

A hydrodynamic bearing device is provided for a spindle motor used in a hard disk drive or the like with a good state of fastening and good fastening strength between a shaft and a fixed member. The hydrodynamic bearing device includes a shaft that has a cylindrical main shaft portion and a fixing portion provided at one end of the main shaft portion, a sleeve that has a bearing hole in which the main shaft portion is inserted in a rotatable state, and a fixed member that is fixed to the fixing portion of the shaft. A nitride layer is formed on the main shaft portion, and a nitride layer non-forming film is formed on the fixing portion.

20 Claims, 7 Drawing Sheets

HYDRODYNAMIC BEARING DEVICE, MOTOR AND INFORMATION RECORDING AND REPRODUCING APPARATUS IN WHICH SAME IS USED, AND METHOD FOR MANUFACTURING SHAFT USED IN HYDRODYNAMIC BEARING DEVICE

CROSS-REFERENCE TO RELATED APPLICATIONS

This application claims priority under 35 U.S.C. §119 to Japanese Patent Application No. 2007-282705 filed on Oct. 31, 2007. The entire disclosure of Japanese Patent Application No. 2007-282705 is hereby incorporated herein by reference.

BACKGROUND OF THE INVENTION

1. Field of the Invention

The present invention relates to a hydrodynamic bearing device for a spindle motor used in an information recording and reproducing apparatus such as a hard disk drive (hereinafter referred to as HDD), and more particularly relates to a technique for fixing a flange or a hub to a shaft which is nitrided to improve hardness and wear resistance.

2. Background Information

Various kinds of information recording and reproducing apparatus in which a HDD is installed have undergone reductions in weight, thickness, and overall size in recent years to make them more portable. However, as the size is reduced, the large memory capacity must be maintained or improved, and impact resistance also must be increased. Hydrodynamic bearing devices, which have high rotation accuracy and excellent impact resistance, have been used as the bearings for spindle motors used in these HDDs.

With a hydrodynamic bearing, as the motor becomes thinner, the length of the fixing portion between the shaft and a flange or hub (the fixed member) decreases, and stronger fastening becomes necessary. The most common ways for fastening the fixing portion are laser welding, a combination of adhesive bonding and press fitting, and so forth.

The shaft that is used in a hydrodynamic bearing device is, for example, made of austenite stainless steel, which has a coefficient of linear expansion close to that of the sleeve material, and Patent Document 1 discloses a technique for increasing hardness and wear resistance by forming a nitriding layer on the surface of the shaft.

Patent Document 1: Japanese Laid-Open Patent Application H10-89345

Patent Document 2: Japanese Laid-Open Patent Application 2004-291851

Patent Document 3: Japanese Laid-Open Patent Application H3-237278

With the conventional configuration discussed above, however, if, for example, a mating component with a flange or other such fixed member is laser welded at the surface of a shaft that has undergone a nitriding treatment, because the nitrided part is hard and has low ductility, a problem is that cracks may develop at the weld site, preventing a proper weld from being obtained. When an adhesive is used for the fixing, a problem is that adhesion deteriorates due to temperature changes and so forth because the nitride layer, which has a different coefficient of linear expansion, is interposed between the shaft and the flange. When press fitting, caulking, or screws are used for the fixing, the surface undergoes plastic deformation, so the nitride layer on the surface may separate, and this tends to be a source of fouling and foreign matter adhesion.

SUMMARY OF THE INVENTION

It is an object of the present invention to provide a hydrodynamic bearing device with a good state of fastening and good fastening strength between the shaft and the fixed member.

According to one aspect of the present invention, a hydrodynamic bearing device includes a shaft that has a cylindrical main shaft portion and a fixing portion provided at one end of the main shaft portion, a sleeve formed with a bearing hole in which the main shaft portion is inserted in a rotatable state, a fixed member that is fixed to the fixing portion of the shaft. A nitride layer is formed on the main shaft portion, and a nitride layer non-forming film is formed on the fixing portion.

With this device, since a nitride layer is formed on the main shaft portion of the shaft inserted in the bearing hole, and a nitride layer non-forming film is formed on the fixing portion of the shaft to which the fixed member is affixed, it is possible to provide a hydrodynamic bearing device with a good state of fastening and good fastening strength between the shaft and the fixed member.

These and other features, aspects and advantages of the present invention will become apparent to those skilled in the art from the following detailed description, which, taken in conjunction with the annexed drawings, discloses exemplary embodiments of the present invention.

BRIEF DESCRIPTION OF THE DRAWINGS

Referring now to the attached drawings which form a part of this original disclosure.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Embodiment 1

Figure 1:
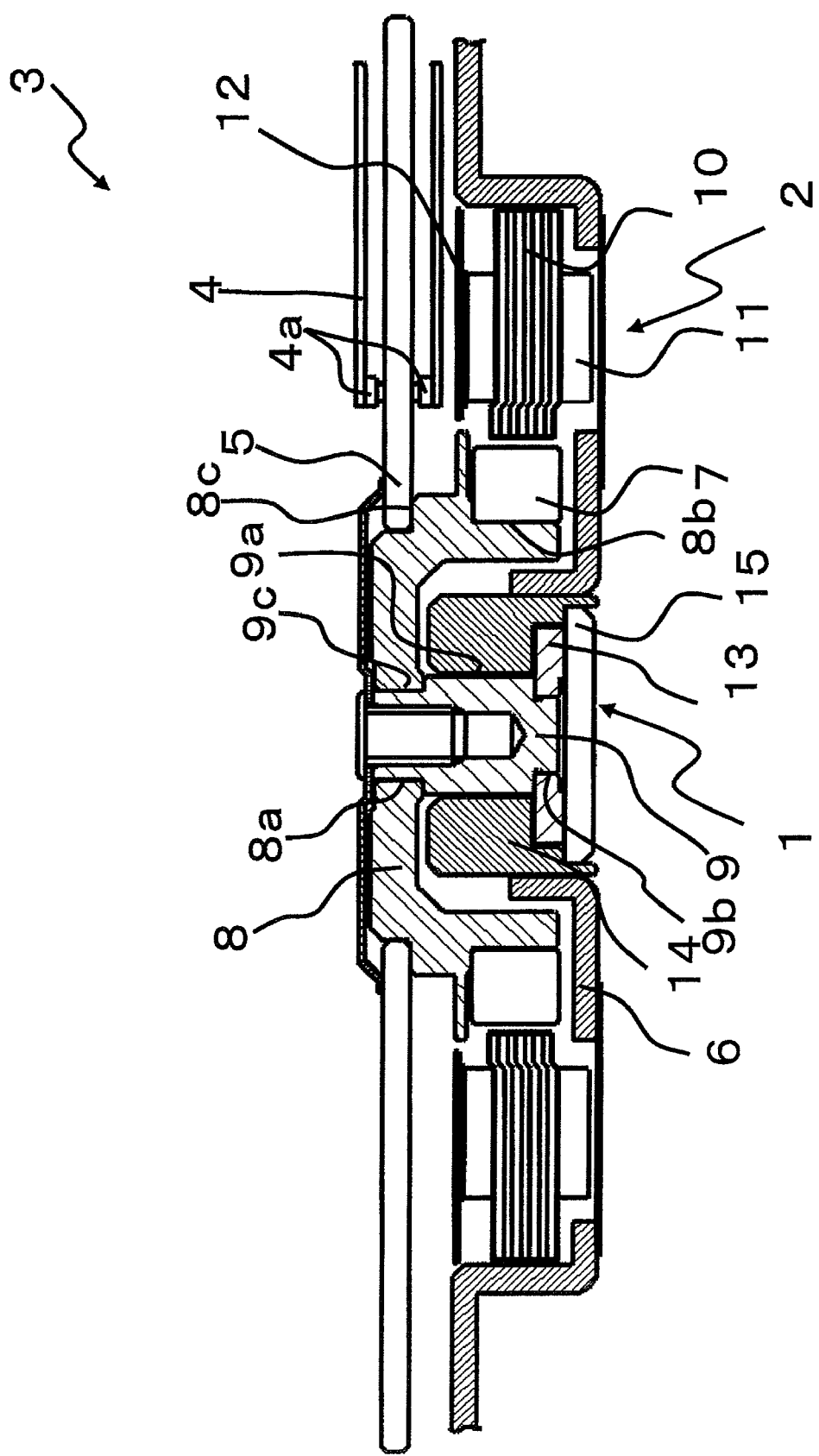
FIG. 1 is a cross section of an information recording and reproducing apparatus according to one embodiment of the present invention.

FIG. 1 shows a HDD (information recording and reproducing apparatus) 3 in which is mounted a spindle motor 2 that includes a hydrodynamic bearing device 1 in Embodiment 1 of the present invention.

Overall Configuration of HDD 3

As shown in FIG. 1, the HDD 3 pertaining to this embodiment has installed in its interior a head portion 4 including a plurality of recording and reproducing heads 4a, and the spindle motor 2. Information is written to a disk (recording medium) 5, or information that has already been written is reproduced by the recording and reproducing heads 4a.

The head portion 4 is equipped with two recording and reproducing heads 4a, and is disposed near the front and back faces of the disk 5.

The disk 5 is a disk-shaped recording medium that is attached to the HDD 3 and whose diameter is, for example, 0.85 inch, 1.0 inch, 1.8 inches, 2.5 inches, or 3.5 inches.

A base 6 is formed from a steel plate or a stainless steel material that has magnetic properties. The front and back sides are subjected to electroless nickel plating, and the base 6 constitutes the portion of the spindle motor 2 on the stationary side. The base 6 may be made of an aluminum alloy (a non-magnetic material) when the disc is large in size. In case of this material, a magnetic plate (not shown) is attached so as to attract a rotor magnet 7 on to the surface of the base 6. The base 6 constitutes part of the sealed housing of the HDD 3. Also, the lower end of a shaft 9 is fixed by adhesive bonding, caulking, or the like near the center portion of the base 6.

A rotor hub 8 is formed from stainless steel having magnetic properties in an inverted cup shape, is mated to the upper end of the cylindrical shaft 9, is fixed by adhesive bonding, caulking, or the like, and rotates integrally with the shaft 9. Also, the rotor hub 8 has a center hole 8a in which the upper end of the shaft 9 is inserted, a magnet holder 8b in the form of a cylindrical hanging wall to which the rotor magnet 7 is attached, and a disk placement face 8c in the form of a circular step on which the disk 5 is placed.

The spindle motor 2 is a device that serves as a rotational drive source for rotationally driving the disk 5, and comprises the rotor magnet 7, a stator core 10, a stator coil 11, a magnetic shield plate 12, the hydrodynamic bearing device 1, etc.

Description of Members Constituting Spindle Motor 2

The rotor magnet 7 is an annular member in which adjacent magnetic poles are alternately disposed as N poles and S poles. It is formed from an Nd—Fe—B-based resin magnet or the like, is mounted on the magnet holder 8b of the rotor hub 8 via a specific gap on the inner radial side of the stator core 10, and is affixed by adhesive bonding, caulking, or the like.

The stator core 10 has a plurality of salient poles (protruding poles) disposed at substantially equiangular spacing in the radial direction. The stator coil 11 is wound around these salient poles. The stator core 10 imparts rotational force to the rotor magnet 7 by means of a magnetic field generated by supplying current to the stator coil 11.

The magnetic shield plate 12 is attached so as to cover the stator core 10 from above, and is made of magnetic, disk-shaped stainless steel having a thickness of approximately 0.1 mm in order to prevent magnetic leakage from the stator core 10 to the outside of the spindle motor 2.

The hydrodynamic bearing device 1 is a bearing included in the spindle motor 2, and is disposed near the center part of the spindle motor 2.

Description of Members Constituting Hydrodynamic Bearing Device 1

The hydrodynamic bearing device 1 includes the shaft 9, a flange 13, a sleeve 14, a thrust plate 15, the rotor hub 8, and the base 6.

The shaft 9 is a member that serves as the rotating shaft of the hydrodynamic bearing device 1, and comprises a cylindrical main shaft portion 9a, and at both ends of this main shaft portion are formed a fixing portion 9b and a hub fixing portion 9c that are cylindrical and are smaller in diameter than the main shaft portion 9a. The fixing portion 9b on the lower side is bonded to the flange 13 (fixed member) by laser welding, for example.

The sleeve 14 has a bearing hole 14a in which the main shaft portion 9a of the shaft 9 is inserted in a rotatable state. The shaft 9 and the flange 13 are inserted in a mutually rotatable state in the bearing hole 14a of the sleeve 14.

A thrust hydrodynamic groove (not shown) for generating hydrodynamic pressure is formed in a herringbone pattern, for example, on the face of the flange 13 opposite the thrust plate 15 in the axial direction, thereby constituting a thrust hydrodynamic component. Similarly, a radial hydrodynamic groove (not shown) for generating hydrodynamic pressure is formed in a herringbone pattern, for example, between one of the opposing faces (in the radial direction) of the shaft 9 and the sleeve 14, thereby constituting a radial hydrodynamic component. The sleeve 14 is formed from brass or another such copper alloy, and its surface is subjected to electroless nickel plating.

ASK 8000, SUS 304L, or the like, which are austenite stainless steel, are used, for example, as the material of the shaft 9.

The method for manufacturing the shaft 9 will now be described through reference to FIG. 2.

Figure 2:
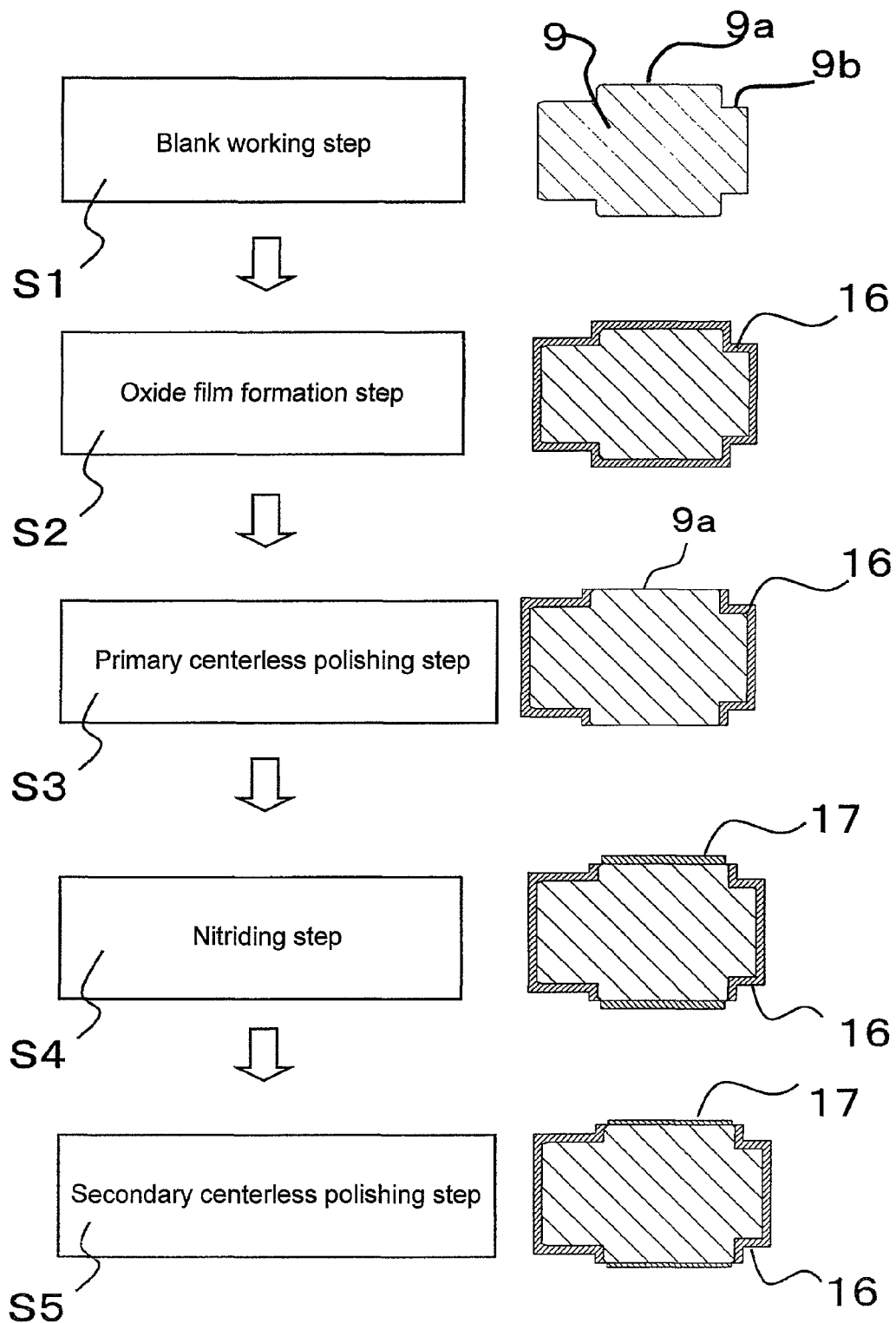
FIG. 2 shows a process of manufacturing the shaft according to one embodiment of the present invention.

FIG. 2 illustrates the process of manufacturing the shaft 9. First, in the blank working step S1, a rod-shaped blank material is turned on a lathe to form the cylindrical main shaft portion 9a that serves as a bearing component having the largest diameter, and to form at one end thereof a fixing portion 9b that mates with the flange 13 shown in FIG. 1 for fixing and has a smaller diameter than that of the main shaft portion 9a. The hardness of the worked portions of the shaft 9 is affected by working hardening and so forth, and the hardness is 400 to 450 Hv, for example. (The Hv hardness discussed here is the Vickers hardness measured at a load of 100 g, and all subsequent instances of hardness are measured in the same way.)

Next, in the oxide film formation step S2, an oxide film layer 16 (nitride layer non-forming film) is formed over the entire surface of the shaft 9, after which the primary centerless grinding or polishing step S3 is performed. "A nitride layer non-forming film" means a non-nitride film like an oxide film which covers the surface of the shaft. Centerless grinding is a process in which the shaft 9 is ground by being passed between two rotating grindstones. At the cylindrical main shaft portion 9a with the largest outer periphery, grinding of from a few micrometers to a few dozen micrometers on one side is performed, removing the oxide film layer 16. However, grinding is not performed at the fixing portion 9b, which is smaller in diameter than the main shaft portion 9a, and the oxide film layer 16 is left intact there.

After this, a nitriding step S4 is performed. This nitriding step is performed, for example, for approximately 5 hours in a nitrogen gas atmosphere of approximately 500° C, which forms a nitride film layer 17 in a thickness of 5 to 50 μm on the main shaft portion 9a. The nitride film layer 17 is very hard, and the hardness of the main shaft portion 9a rises to between 1100 and 2000 Hv. Here, the oxide film layer 16 is formed on the portion of the shaft 9 other than the main shaft portion 9a, such as the fixing portion 9b, and almost no nitride film layer is formed on the oxide film layer 16, so the hardness is kept low at 400 to 650 Hv.

Finally, in the secondary centerless grinding step S5, the nitride film layer 17 is ground by centerless grinding one side to a depth ranging from a few microns to 48 μm. This is because finishing must be performed on the thickness of the nitride film layer 17 after nitriding in order to ensure dimensional precision of the bearing component, which demands precision. Even if the portion of the nitride film layer 17 with the smallest thickness of 5 μm is subjected to grinding of 3 μm, at least 2 μm of the nitride film layer 17 will remain. It has been confirmed experimentally that the hardness will be at least 750 Hv if there is 2 μm of the nitride film layer 17, and the strength and wear resistance of the bearing component can be improved.

Figure 7:
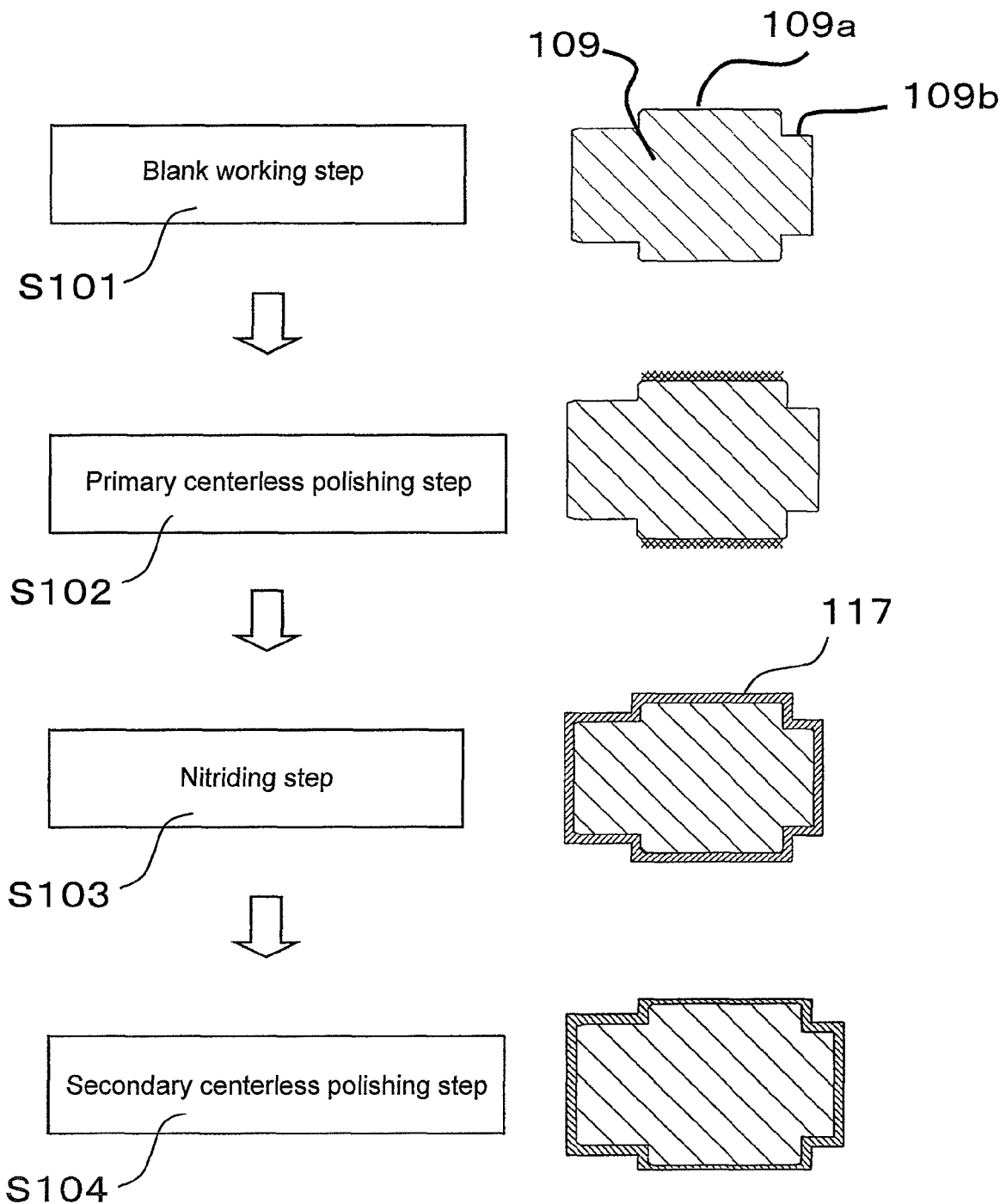
FIG. 7 is a process of manufacturing a shaft according to a comparative example.

A method for manufacturing a conventional shaft 109 will be described. FIG. 7 shows the manufacturing process for a conventional shaft 109, which is a comparative example to be compared with an example according to the present invention. First, in the blank working step S101, a rod-shaped blank is turned on a lathe to form a main shaft portion 109a and a fixing portion 109b, which is smaller in diameter than the main shaft portion 109a and is for fixing by mating with a flange, at one end thereof. Then, the primary centerless grinding step S102 is performed. This is followed by the nitriding step S103. After this, the nitride film layer 117 on the main shaft portion surface is ground in the secondary centerless grinding step S104. Even with a conventional process, very precise working was necessary prior to the nitriding, so primary centerless grinding was performed before the nitriding step, and a step of performing secondary centerless grinding had to be performed after nitriding as finishing to correct unevenness of the nitriding.

Figure 3A:
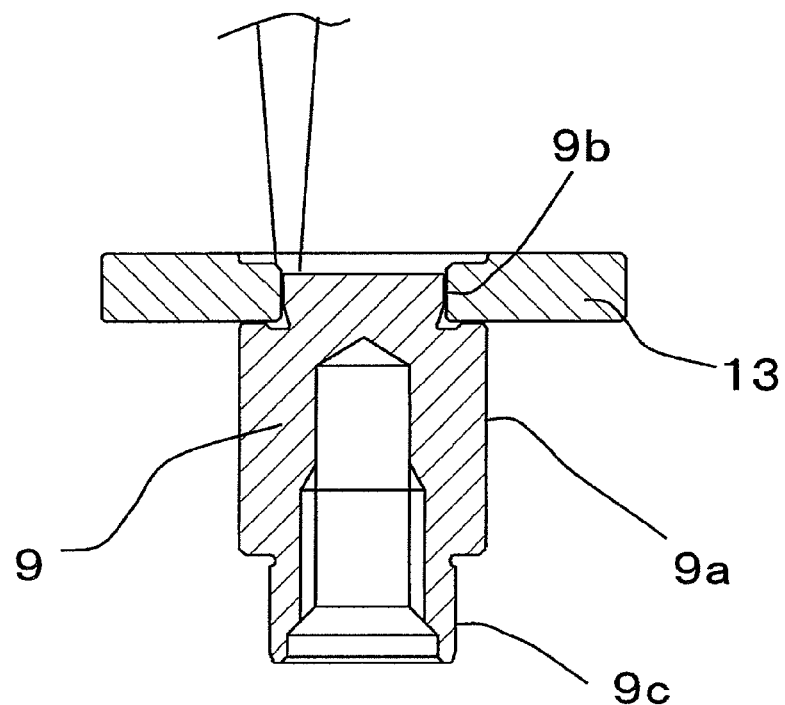
FIG. 3A is a cross section of a coupled status of the shaft and the flange according to one embodiment of the present invention.
Figure 3B:
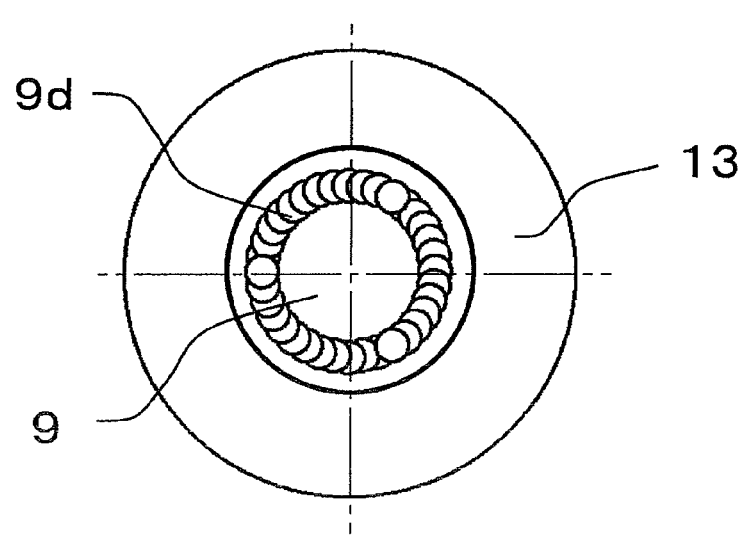
FIG. 3B is a plan view of a coupled status of the shaft and the flange according to one embodiment of the present invention.

Next, the fastening of the shaft 9 and the flange 13 will be described through reference to FIGS. 3A and 3B. The material of the flange 13 is SUS 304L, for example. The shaft 9 and the flange 13 are fastened by welding, in which the fixing portion 9b of the shaft 9 is mated with the circular hole formed in the center of the disk-shaped flange 13 as shown in FIG. 3A, and the mated portions are irradiated with a laser. In this welding, for example, a YAG laser is simultaneously directed at three locations, spaced at an equiangular pitch of 120° in the circumferential direction of the fixing portion 9b of the shaft 9. The irradiation is performed in three shots at an interval of 8 shots per second and an output of 0.8 Kw. At the time of a shot, the shaft 9 and the flange 13 are rotated relative to the laser irradiated location at a rotational speed of 4 seconds per revolution. As a result, welding is performed all the way around the periphery as shown in FIG. 3B. At this point, since the oxide film layer 16 has been formed on the fixing portion 9b of the shaft 9 irradiated with the laser, there is no hard nitride film layer 17 unlike in the conventional example, which means that there is ductility, allowing a good weld to be obtained.

Differences in welding results will now be described, using an example of the present invention and a comparative example.

Figure 4A:
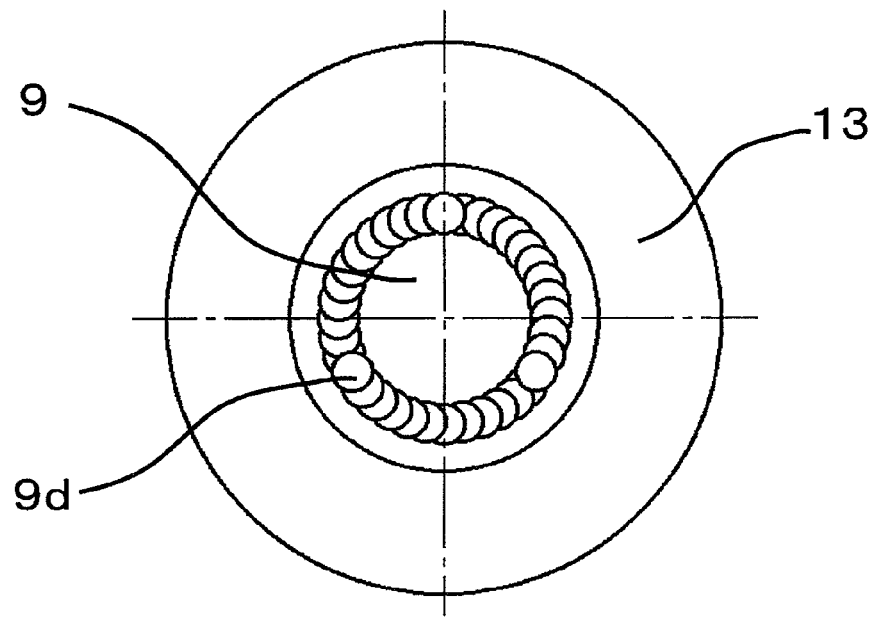
FIG. 4A is a plan view of the shaft fixed portion according to one embodiment of the present invention.
Figure 4B:
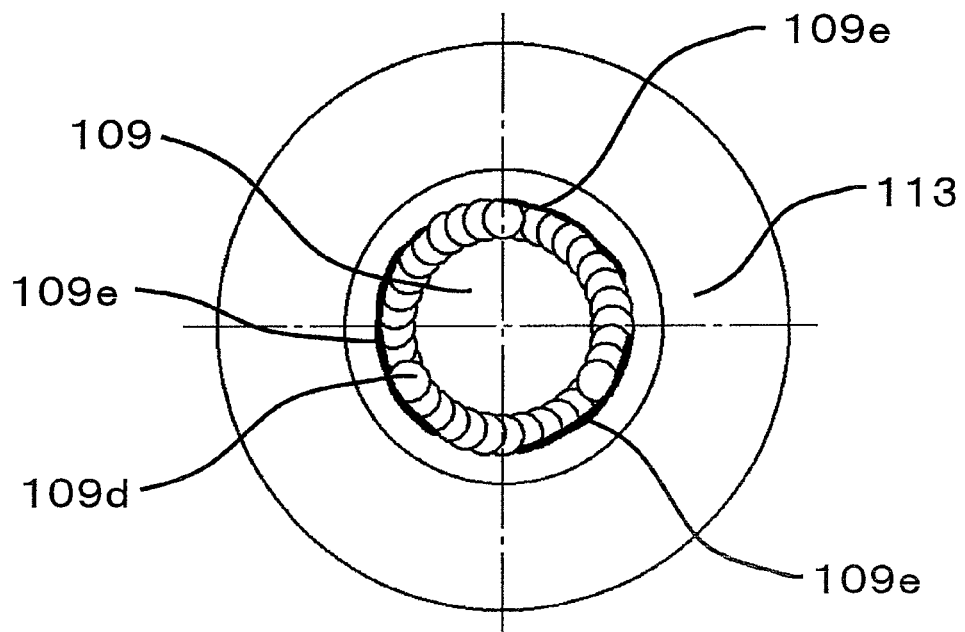
FIG. 4B is a plan view of the shaft fixed portion according to a comparative example.

FIG. 4A shows the state after welding when there is no nitride film layer because an oxide film is formed on the fixing portion 9b of the shaft 9 (an embodiment of the present invention), and FIG. 4B shows the state after welding when there is a nitride film layer on the fixing portion 109b of the shaft 109 (comparative example). When there is no nitride film layer 17, as shown in FIG. 2, because an oxide film is formed as in FIG. 4A, a uniform spot welding state can be obtained that is free of cracks in the weld 9d. However, when there is a nitride film layer as in FIG. 4B and welding is performed there, not only do cracks 109e form in the weld 109d, but the welded state is noticeably more soiled and uneven.

Thus, an oxide film is formed on the shaft 9, and just the oxide film layer 16 is removed from just the main shaft portion 9a around the outer periphery by centerless grinding, after which nitriding is performed, the result being that the nitride film layer 17 is formed with good wear resistance and hardness on the main shaft portion 9a, while the formation of the nitride film layer 17 can be prevented by the oxide film layer 16 formed on the fixing portion 9b. Consequently, since not only is a masking ring unnecessary for preventing the formation of the nitride film layer 17, but there is also no need to attach and remove this ring, so a hydrodynamic bearing device with higher production efficiency can be provided. The main shaft portion 9a is a bearing component with excellent wear resistance and hardness, and since the fixing portion 9b has no nitride film layer 17, a hydrodynamic bearing device 1 can be provided that has a good fastening strength and fastening state between the shaft 9 and the flange 13, which is the member being fixed. Furthermore, the hydrodynamic bearing device 1 featuring the shaft 9 manufactured by this process has excellent wear resistance during start-up and shut-down and is a bearing with high impact resistance. Also, the spindle motor 2 in which this hydrodynamic bearing device 1 is used will have high impact resistance, making it a motor with a longer service life. Furthermore, the HDD 3 in which this spindle motor 2 is used will also have high impact resistance, so product life can be extended.

Other Embodiments

An embodiment of the present invention was described above, but the present invention is not limited to or by the above embodiment, and various modifications are possible without departing from the gist of the invention.

(A)

In the above embodiment, a constitution was disclosed in which the method for fastening the shaft 9 and the flange 13 was welding as shown in FIG. 1, but the present invention is not limited to this.

For instance, the shaft 9 and the flange 13 may be fixed to the fixing portion 9b by adhesive bonding, press fitting, caulking, screws, or a combination of two or more of these. When they are fixed with an adhesive, there is less deterioration of adhesion due to temperature changes, so a decrease in adhesive strength can be prevented, and when they are fixed by press fitting, caulking, or screws, there will be no separation of the nitride film layer 17 during plastic deformation, so fouling and foreign matter adhesion can be prevented.

When the shaft 9 and the flange 13 are thus fixed to each other at the fixing portion 9b by adhesive bonding, press fitting, caulking, screws, or a combination of two or more of these, the shaft 9 will have a main shaft portion 9 a, which is the bearing component, with excellent hardness and wear resistance, and a fixing portion 9 b with good fastening strength and fastening state, allowing the same effect as in Embodiment 1 to be obtained.

(B)

In the above embodiment, the material of the sleeve 14 shown in FIG. 1 was brass or another such copper alloy whose surface has been subjected to electroless nickel plating, but the present invention is not limited to this.

For example, the sleeve 14 may be made of stainless steel or another iron-based material.

Here again, the hardness and wear resistance of the main shaft portion 9a are increased, while the fastening strength and the fastening state of the fixing portion 9b can be improved, allowing the same effect as in Embodiment 1 to be obtained.

(C)

In the above embodiment, the fastening of the shaft 9 and the flange 13 was disclosed, but the present invention is not limited to this.

For example, the fixed member may be a member that mates with the shaft 9, such as the rotor hub 8 or a retainer (not shown).

Here again, the hardness and wear resistance of the bearing component are increased, while the fastening strength and the fastening state of the fixing portion can be improved, allowing the same effect as in Embodiment 1 to be obtained.

(D)

In the above embodiment, the oxide film layer 16 was removed by subjecting the cylindrical main shaft portion 9a, which is a portion having the largest diameter, to centerless grinding as shown in FIG. 2, but the present invention is not limited to this.

For example, if the diameter of the fixing portion 9b is greater than the diameter of the main shaft portion 9a, the oxide film layer 16 may be removed by rotating the shaft 9 with it supported at the centers at both ends, and polishing just the main shaft portion 9a with a whetstone, or subjecting it to precision grinding.

Here again, the oxide film layer 16 is removed from the main shaft portion 9a, and the oxide film layer 16 remains on the fixing portion 9b, so when nitriding is performed, the same effect as in Embodiment 1 can be obtained.

(E)

In the above embodiment, the fastening was disclosed to be laser welding of a rotating-shaft bearing, in which the shaft 9 and the flange 13 rotate with respect to the sleeve 14, but the present invention is not limited to this.

Figure 5:
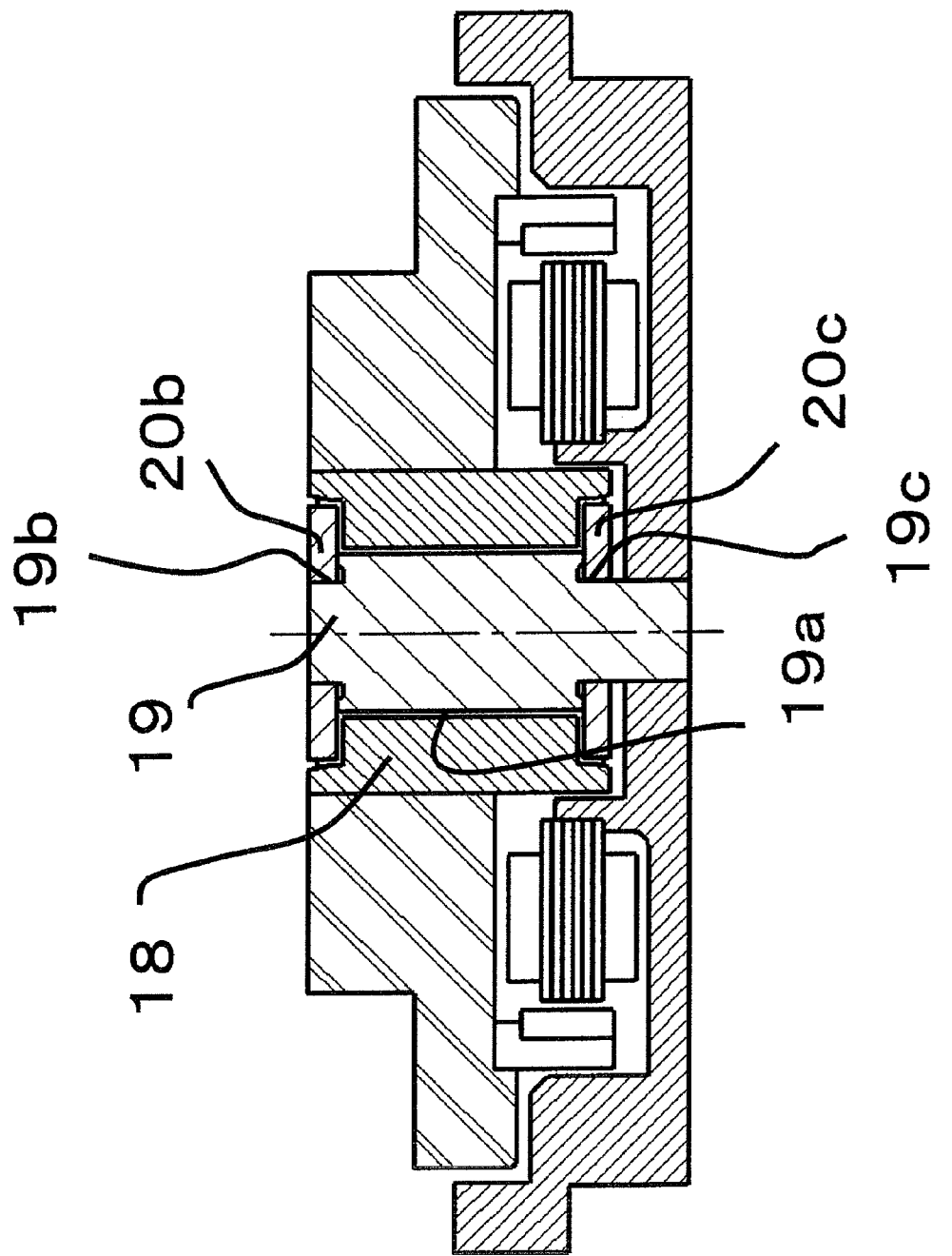
FIG. 5 is a cross section of a spindle motor according to another embodiment of the present invention.

For example, as shown in FIG. 5, the bearing may be a fixed-shaft bearing, in which a sleeve 18 rotates with respect to a shaft 19. Here again, by forming an oxide film layer on an upper fixing portion 19b and a lower fixing portion 19c, which respectively fix an upper flange 20b and a lower flange 20c with respect to the shaft 19, the hardness and wear resistance of the cylindrical main shaft portion 19a (the bearing component) are increased, while the fastening strength and fastening state of the fixing portions can be improved, allowing the same effect as in Embodiment 1 to be obtained.

(F)

In the above embodiment, it was explained that an oxide film was formed as the nitride layer non-forming film, but the present invention is not limited to this.

If it is a surface treatment having the effect of impeding nitriding, then the nitride film layer 17 with good hardness and wear resistance is formed on the outer periphery of the main shaft portion 9a shown in FIG. 2, while the oxide film layer 16 is formed on the fixing portion 9b, with no nitride film layer 17 formed there, and as a result, the fastening strength and fastening state can be improved, allowing the same effect as in Embodiment 1 to be obtained.

(G)

In the above embodiment, ASK8000 was given as the material of the shaft 9, but the present invention is not limited to this.

If the material is an austenite-based stainless steel with a hardness of 180 to 650 Hv, then the nitride film layer 17 with good hardness and wear resistance is formed on the outer periphery of the main shaft portion 9a shown in FIG. 2, while the oxide film layer 16 is formed on the fixing portion 9b, with no nitride film layer 17 formed there, and as a result, the fastening strength and fastening state can be improved, allowing the same effect as in Embodiment 1 to be obtained.

(H)

In the above embodiment, the description involved nitriding conditions in which the treatment was carried out for approximately 5 hours in a nitrogen gas atmosphere of approximately 500° C, but the present invention is not limited to this.

If the nitriding conditions are such that the treatment is carried out for 4 to 6 hours in a nitrogen gas atmosphere of 300 to 800° C, the nitride film layer 17 will be formed on the fixing portion 9b on which the oxide film layer 16 is not formed, ensuring good hardness and wear resistance of the bearing, and allowing the same effect as in Embodiment 1 to be obtained.

(I)

In the above embodiment, a treatment was described in which a film was formed on the main shaft portion 9a and the fixing portion 9b of the shaft 9, but the present invention is not limited to this.

Figure 6:
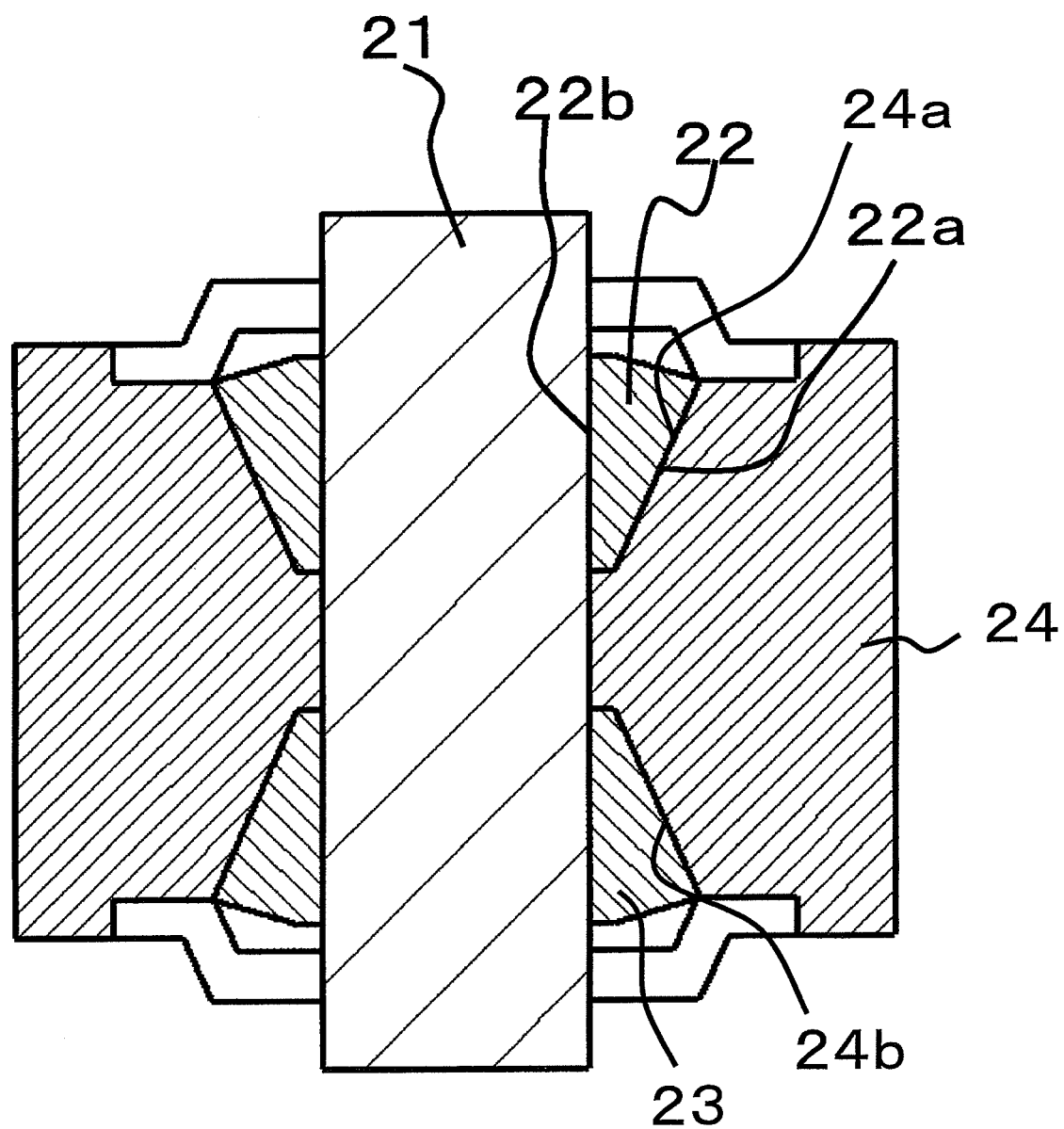
FIG. 6 is a cross section of a hydrodynamic bearing device according to another embodiment of the present invention.

With the conical bearing shown in FIG. 6, for example, a film may be formed on an upper bearing member 22 attached to a shaft 21. This conical bearing has the shaft 21, the upper bearing member 22, a lower bearing member 23, and a sleeve 24. The upper bearing member 22 has a through-hole 22b which is mated with and fixed to the shaft 21, and a conical side wall portion 22a whose rotational axis is the center axis of the through-hole 22b. The lower bearing member 23 is the same as the upper bearing member 22. The sleeve 24 has conical recesses 24a and 24b into which the side wall portions 22a are inserted in a rotatable state. This forms a conical bearing component.

With the upper bearing member 22, a nitride layer is formed on the side wall portion 22a, and an oxide film is formed as a nitride layer non-forming film on the through-hole 22b. The method for forming these films is the same as in the embodiment discussed above. For example, first an oxide film layer is provided to the upper bearing member 22, and then the oxide film layer of the side wall portion 22a is removed, after which nitriding is performed. As a result, although a nitride film layer is formed on the side wall portion 22a, an oxide film layer remains on the through-hole 22b, so no nitride film layer is formed there.

Accordingly, an effect can be obtained whereby a nitride film layer with good hardness and wear resistance is formed on the side wall portion 22a, while the through-hole 22b has no nitride film layer because the oxide film layer was formed, and the fastening strength and fastening state with the shaft can be improved.

(J)

In the above embodiment, as shown in FIG. 1, a case was described of applying the present invention to the fastening of a spindle motor used in a HDD as an information recording and reproducing apparatus. The present invention is not, however, limited to this.

For example, besides a HDD, the device in which the bearing is installed can also be an opto-magnetic disk device, and optical disk device, a Floppy® disk device, a laser printer, a laser scanner, a video cassette recorder, a data streamer, or the like.

The hydrodynamic bearing device, the motor and information recording and reproducing apparatus in which said device is used, and the method for manufacturing a shaft used in a hydrodynamic bearing device pertaining to the present invention allow for the provision of a hydrodynamic bearing device with a good state of fastening and good fastening strength between the shaft and the fixed member, and are useful as a hydrodynamic bearing device that is installed in an information recording and reproducing apparatus, typified by a hard disk device or the like.

(K)

In the above embodiment, it was explained that an oxide film was formed and remained as the nitride layer non-forming film, but the present invention is not limited to this. The formed oxide film on the fixing portion may be removed after forming the nitride film on the main shaft portion by chemical treatment, mechanical treatment or another treatment. This treatment brings better laser welding condition.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A hydrodynamic bearing device, comprising:
   a shaft having two end portions and a main shaft portion extending between the two end portions, one of the two end portions including a fixing portion;
   a sleeve formed with a bearing hole, the main shaft portion of the shaft being rotatably disposed in the bearing hole; and
   a fixed member that is fixed to the fixing portion,
   wherein a nitride layer is formed on the main shaft portion of the shaft, and
   wherein a nitride layer non-forming film is formed on the fixing portion.

2. The hydrodynamic bearing device according to claim 1, wherein the fixing portion is smaller in diameter than the main shaft portion.

3. The hydrodynamic bearing device according to claim 2, wherein the nitride layer non-forming film is an oxide film.

4. The hydrodynamic bearing device according to claim 2, wherein the fixed member is fixed to the fixing portion by welding, adhesive bonding, press fitting, caulking, screws, or a combination thereof.

5. The hydrodynamic bearing device according to claim 1, wherein the nitride layer non-forming film is an oxide film.

6. The hydrodynamic bearing device according to claim 1, wherein the fixed member is fixed to the fixing portion by welding, adhesive bonding, press fitting, caulking, screws, or a combination thereof.

7. A spindle motor in which the hydrodynamic bearing device according to claim 1 is installed.

8. An information recording and reproducing apparatus, comprising:
   the spindle motor according to claim 7; and
   a recording medium that is attached to the spindle motor.

9. A hydrodynamic bearing device, comprising:
   a shaft;
   a bearing member that is mated and fixed to the shaft and is formed with a through-hole, the bearing member having a conical side wall portion arranged such that a rotational axis of the conical side wall portion is concentric with a center axis of the through-hole; and
   a sleeve formed with a bearing hole and a conical recess, the shaft being rotatably disposed in the bearing hole, and the conical side wall portion being rotatably disposed in the conical recess,
   wherein a nitride layer is formed on the conical side wall portion, and
   wherein a nitride layer non-forming film is formed on the through-hole.

10. The hydrodynamic bearing device according to claim 9, wherein the nitride layer non-forming film is an oxide film.

11. The hydrodynamic bearing device according to claim 10, wherein the bearing member is fixed to the shaft by welding, adhesive bonding, press fitting, or a combination thereof.

12. The hydrodynamic bearing device according to claim 9, wherein the bearing member is fixed to the shaft by welding, adhesive bonding, press fitting, or a combination thereof.

13. A spindle motor in which the hydrodynamic bearing device according to claim 9 is installed.

14. An information recording and reproducing apparatus, comprising:
    the spindle motor according to claim 13; and
    a recording medium that is attached to the spindle motor.

15. A hydrodynamic bearing device, comprising:
    a shaft having a first distal end, a second distal end, and a main shaft portion extending from the first distal end to the second distal end, wherein the first distal end includes a fixing portion;
    a sleeve formed with a bearing hole, the main shaft portion of the shaft being rotatably disposed in the bearing hole; and
    a fixed member that is fixed to the fixing portion,
    wherein a nitride layer is formed on the main shaft portion of the shaft, and
    wherein a nitride layer non-forming film is formed on the fixing portion.

16. The hydrodynamic bearing device of claim 15, wherein said device is formed by a process comprising:
    coating an entirety of the shaft with the nitride layer non-forming film;
    removing the nitride layer non-forming film only from the main shaft portion of the shaft; and
    forming the nitride layer on the shaft,
    wherein said nitride layer non-forming film prevents the formation of nitride, such that the nitride layer is only formed on the main shaft portion from which the nitride layer non- forming film has been removed.

17. The hydrodynamic bearing device of claim 15, wherein the nitride layer non-forming film is provided on each of the first distal end and the second distal end.

18. The hydrodynamic bearing device according to claim 15, wherein the nitride layer non-forming film is an oxide film.

19. The hydrodynamic bearing device according to claim 15, wherein the fixed member is fixed to the fixing portion by welding, adhesive bonding, press fitting, caulking, screws, or a combination thereof.

20. The hydrodynamic bearing device according to claim 15, wherein the fixed member is fixed to the fixing portion by welding.

* * * * *